United States Patent [19]

Fischer et al.

[11] Patent Number: 4,858,051
[45] Date of Patent: Aug. 15, 1989

[54] SYSTEM FOR THE RECORDING AND/OR PLAYBACK OF SIGNALS

[75] Inventors: Karl Fischer, Perchtoldsdorf; Werner Köck, Leopoldsdorf; Wolfgang Tuider, Oberdorf, all of Austria

[73] Assignee: U.S. Philips Corporation, New York, N.Y.

[21] Appl. No.: 119,607

[22] Filed: Nov. 12, 1987

[30] Foreign Application Priority Data

Nov. 14, 1986 [AU] Australia .......................... A3038/86
Mar. 26, 1987 [EP] European Pat. Off. ......... 87200576.4

[51] Int. Cl.4 .......................................... G11B 15/00
[52] U.S. Cl. ...................................... 360/137; 360/91
[58] Field of Search ...................... 360/91, 92, 93–94, 360/96.1, 96.3, 96.5, 132, 137

[56] References Cited

U.S. PATENT DOCUMENTS 3,684,298  8/1972  Ban ..................................... 360/94 X
4,319,290  3/1982  Bolick, Jr. et al. ................... 360/92
4,785,362  11/1988  Nozawa et al. ....................... 360/85

FOREIGN PATENT DOCUMENTS

1903185  6/1970  Fed. Rep. of Germany.

Primary Examiner—John H. Wolff
Attorney, Agent, or Firm—Edward W. Goodman

[57] ABSTRACT

A recording and/or playback machine (1) for tape-shaped record carriers (20) is equipped, for indicating continuous recording times, with a counter (45) having an indicating element (46) which travels along the entire length indicating scale (26) of a predetermined total length for each of the possible continuous total-recording times and which can be driven via a speed change gear (71) mechanism switchable in steps, which can be switched to different speed ratios for driving the indicating element at speeds inversely proportional to the corresponding continuous total-recording times. The machine (1) is designed for receiving a cassette (4), in which the record carrier (20) is accommodated and which has at least one indicator (28,29) for indicating the continuous total-recording time obtainable by means of this record carrier, and in the machine (1) there if a sensing device (91) for sensing the indicator of a cassette inserted into the machine. The sensing device (91) automatically controls the switching of the speed change gear mechanism as a function of the sensed indicator (28,29).

9 Claims, 3 Drawing Sheets

SYSTEM FOR THE RECORDING AND/OR PLAYBACK OF SIGNALS

BACKGROUND OF THE INVENTION

This invention relates to a system for the recording and/or playback signals, comprising a machine and tape-like record carriers which can be advanced in the system machine and by means of which continuous total-recording times of differing amounts can be obtained, this machine having, in order to indicate the continuous recording time corresponding to the particular amount of the record carrier advanced in the machine, a counter having an indicating element which travels along an indicating scale of predetermined total length and which can be driven from a drive device for the recording carrier via a speed change gear mechanism switchable in steps, which, in conformity with the continuous total-recording time of differing amounts, can be switched to different speed ratios inversely proportional to the corresponding continuous total-recording times, so that each of the continuous total-recording times of differing amounts can be indicated by means of the entire predetermined total length of the indicator scale.

Such a system is known from DE-AS No. 1,903,185. This known system comprises a so-called spool machine which is designed for receiving two spools and in which a recording carrier, during its advance is unwound from one spool and wound onto the other spool. The relevant spools of different sizes, onto which recording carriers of differing length are wound, can be inserted into the machine. Different advancing speeds can be selected for the recording carriers during recording and during playback, so that, depending on the spool size and the advancing speed, continuous total-recording times of differing amounts for information are obtained. To ensure that, of all the selectable continuous total-recording times of differing amounts, the continuous recording time corresponding to the particular length of recording carrier advanced in the system machine can be indicated by means of a counter having an indicating scale of fixed predetermined total length, the indicating element of the counter is driven via a speed change gear mechanism switchable in steps, the speed ratios of which are inversely proportional to the selectable continuous total-recording times. In the machine of the known system, the speed change gear mechanism has a crown gear wheel with three sets of teeth coaxial relative to one another and arranged in one plane on different diameters, and a pinion which is adjustable relative to the crown gear wheel in the radial direction of the latter and which can be engaged selectively with one of the sets of teeth of the crown gear wheel in order to switch the speed change gear mechanism. For this purpose, the pinion is attached to a shaft which is guided adjustably in the axial direction and which can be adjusted by means of a slide connected to it and shiftable via a manually adjustable actuating knob projecting from it. Thus, in this known system, the speed change gear mechanism for driving the indicating element of the counter has to be switched by hand. This makes it more complicated to operate the system and also entails the danger that the system user, when switching the speed change gear mechanism by hand, can make a mistake or forget manual switching completely, thus resulting in a misleading false reading.

SUMMARY OF THE INVENTION

The set object of the invention is to avoid the above-mentioned difficulties of the existing system and provide a system in which the speed change gear mechanism is switched correctly in an especially simple and reliable way. To achieve this, the invention is characterized in that the machine is designed to receive any of a plurality of cassettes, in each of which a recording carrier is accommodated, in that the plurality of cassettes each have at least one indicator for indicating the continuous total-recording time obtainable by means of the recording carrier, and the machine is provided with a sensing device for sensing the indicator, the sensing device controlling the switching of the speed change gear mechanism for driving the indicating element, as a function of the sensed indicator. This ensures that, when a system cassette is inserted into the system machine, the speed change gear mechanism for driving the indicating element of the counter is switched automatically as a function of the sensed indicator of this cassette. Because the speed change gear mechanism for driving the indicating element of the counter is switched as a function of the sensed indicator, it is always guaranteed that the speed change gear mechanism will be switched correctly, so that the counter cannot give a false reading.

It may be mentioned, at this juncture, that U.S. Pat. No. 3,684,298 makes known a system with a machine designed for receiving a cassette with a recording carrier accommodated in it, continuous total-recording times of differing amounts being obtainable by changing the advancing speed of the recording carrier for recording and for playback. Here, each of the appropriate cassettes has an indicator provided in a corner region of the cassette for indicating the continuous total-recording time obtainable by means of the recording carrier accommodated in the particular cassette. For sensing the indicator of each cassette, the relevant machine has a sensing device which controls the switching of a drive device for the recording carrier as a function of the sensed indicator, so that the carrier is advanced at an advancing speed determined by the indicator. In contrast to this, in the system according to the invention, the sensing device of the machine, as a function of the sensed indicator of the cassette, controls the switching of the speed change gear mechanism for driving the indicating element of a counter in order to indicate the continuous recording time corresponding to the particular amount of recording carrier advanced in the system machine, as a result of which the entire length of an indicating scale of fixed predetermined total length can be used to indicate each of the continuous total-recording times of differing amounts, high operating reliability being achieved as a result of automatic matching to different operating conditions.

The widest variety of gear types, such as belt gears, friction gears or toothed gears, can be used as the speed change gear mechanism. The toothed gear assembly used can include, for example, a crown gear, as in the machine of the system known from DE-AS No. 1,903,185 mentioned in the introduction, although this involves a relatively high outlay in terms of production. In a system with a speed change gear mechanism designed as a toothed gear assembly, it has proved advantageous for the toothed gear assembly to have a number of gears coaxial relative to one another and of differing design as regards the transmission ratios obtainable, this number corresponding to the number of continuous total-recording times of differing amounts, and for switching the toothed gear assembly, these gears being adjustable in the axial direction between a number of operating positions corresponding to the number of continuous total-recording times of differing amounts and, at the same time, being engageable with at least one fixed gear. Such toothed gear assembly requires only a relatively low outlay in terms of production.

It has also proved advantageous, in this respect, for the adjustable gears to be formed by spur wheels of differing diameters, which can be engaged with fixed spur wheels corresponding to these and likewise coaxial relative to one another. Such a spur gear assembly is advantageous in that smooth and undisturbed intermeshing of the gears is possible when the speed change gear mechanism is switched.

However, in the above respect, it has also proved advantageous for the adjustable gears to be formed by worms with differing numbers of starts, which can be driven from the drive device and engaged with a fixed worm wheel, from which the indicating element can be driven. Such a worm gear assembly is advantageous in terms of a high speed ratio obtained by means of the switchable speed change gear mechanism.

The sensing device for sensing the indicator of a cassette inserted into the machine of the system according to the invention can be photoelectric or composed of electrical switch contacts and can control the switching of the speed change gear mechanism by means of a electromechanical device. The sensing device can also be mechanical and have, for example, a two-armed lever, one end of which senses the indicator and the other end of which controls the switching of the speed change gear mechanism. As regards a mechanical sensing device, it has proved especially advantageous for the appropriate cassettes to be equipped with an indicator which can be sensed mechanically by the sensing device, and for the sensing device to have two levers which are coupled to one another at least via a spring and can be held in a position aligned with one another by means of the spring, and of which one senses the indicator and the other controls the switching of the speed change gear mechanism. This ensures that, during the adjusting movement intended for switching the speed change gear mechanism and driven directly in a mechanical way from the adjusting movement of the cassette when the latter is inserted into the system machine, the magnitude of the adjusting force and the effective duration of the adjusting force for switching the speed change gear mechanism are independent of the adjusting movement of the cassette and of the lever adjusted by the latter and are determined only by the spring. It is thereby possible to prevent damage to the speed change gear mechanism during the switching of the latter.

Most known cassettes have two parallel main cassette walls, a front and a rear narrow cassette wall and two lateral narrow cassette walls. A system according to the invention, suitable for such cassettes, can be characterised in that the cassettes can be inserted into a system machine in two operating positions rotated relative to one another in respect to the two main cassette walls, in that at least one particular indicator on the cassette is assigned to each of the two operating positions of the cassettes, and the indicators assigned to the two operating positions are provided on the cassette in two positions rotated relative to one another in respect of the two main cassette walls, in that the machine has only a single sensing device, and in that each of the indicators assigned to the two operating positions can be sensed by means of the single sensing device. In such as system, the cassette is of simple design and the machine need be equipped with only a single sensing device.

There is a further preferred embodiment which is characterized in that the indicators are each formed by a recess in the cassette housing, each of the recesses extending up to a main cassette wall and a lateral narrow cassette wall. This advantageously ensures that the indicators can be sensed from the side and from below or from above. There is therefore relatively wide freedom in the design of the sensing device.

In this respect, an embodiment which has proved especially advantageous is characterized in that each of the recesses is provided in a front corner region of the cassette housing and extends up to the two main cassette walls, a lateral narrow cassette wall and the front narrow cassette wall, so that the cassette, as seen in a direction perpendicular to the front narrow cassette wall, has, in its front region, two mutually symmetrical lateral contractions in relation to the remaining cassette housing. In this system, the indicators of the cassette can be sensed from the side, both from above and from below, and also from the front. There is therefore maximum freedom in the design of the sensing device. Moreover, this ensures that the cassettes have a reduced volume and a correspondingly reduced mass, because the cassette is narrowed in its front region. The cassettes of the system can be distinguished from one another without difficulty, even in the dark, either by hand or by means of automatic devices. In particular, the narrowing of the housing can be sensed in a simple way by hand or by means of a feeler and can easily be perceived by sight.

Further advantages are obtained by means of an embodiment which is characterized in that the cassettes additionally have, on their front narrow cassette wall, two erase prevention indicators which are each assigned to one of the two cassette operating positions rotated relative to one another and which are provided on the cassette in two positions rotated relative to one another in respect of the two main cassette walls, in that the machine has only one further sensing device for sensing the two erase prevention indicators, and in that the indicators can be sensed by the two sensing devices when a cassette is inserted into the machine asa result of the shifting of the cassette parallel to the main cassette walls, with the front narrow cassette wall foremost. A system designed in this way makes it possible for it to be used simply and in the smallest possible space, with the most important functions of the machine being controlled at the same time. Because the relevant indicators are located on the front of the cassette, the cassette need only be introduced into the machine as far as is necessary for driving the recording carrier, and the sensing devices can be designed so that, in a direction perpendicular to the main cassette walls, they take up virtually no space exceeding the relevant dimensions of the cassettes. This provides the possibility of reducing the volume and mass of the machined considerably, which is important especially in systems with portable machines, such as portable dictating machines.

BRIEF DESCRIPTION OF THE DRAWING

The invention is described in detail below by means of several exemplary embodiments, although it is not intended to be restricted to these.

DETAILED DESCRIPTION OF THE INVENTION

Figure 1:
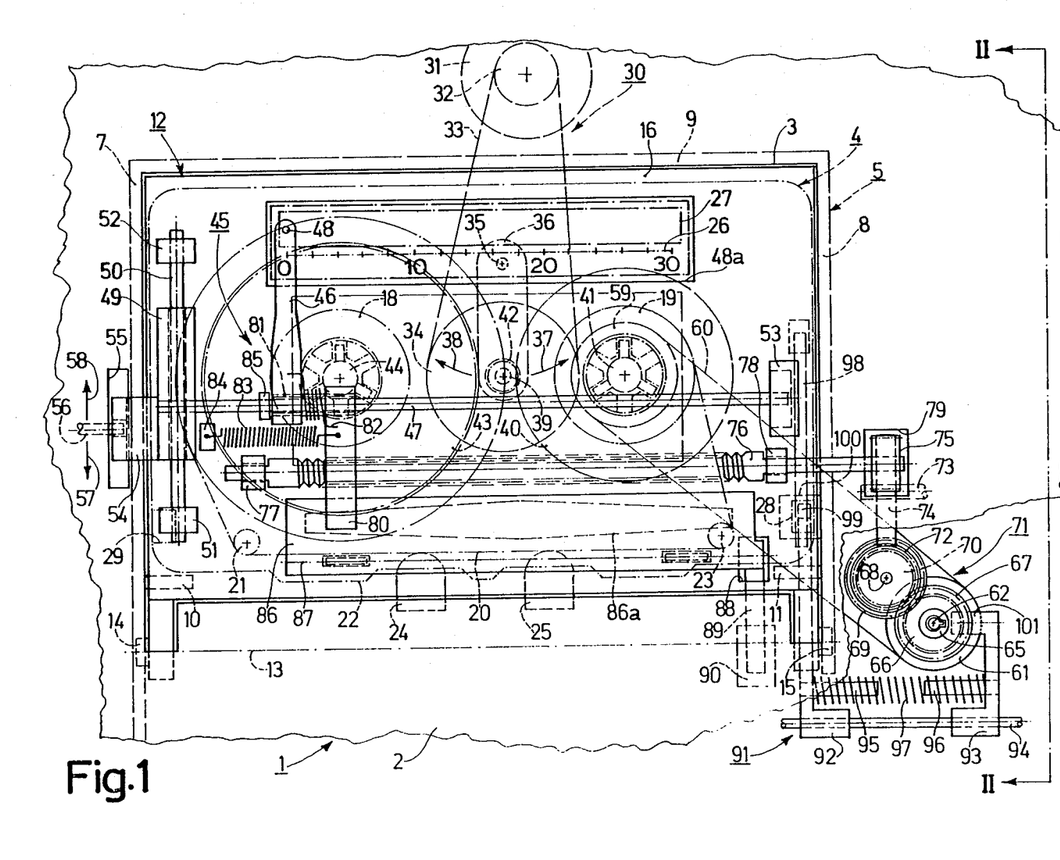
FIG. 1 shows a diagrammatic plan view, enlarged approximately two and a half times, of a part of a first system essential to the invention, comprising a recording and playback machine designed as a pocket dictating machine and magnetic tapes accommodated in cassettes and functioning as recording carriers, the counter of the pocket dictating machine being accommodated in a shutter flap for a cassette receiving space, and the speed change gear mechanism switchable in steps, for driving the indicating element of the counter, being designed as a spur gear assembly.
Figure 2:
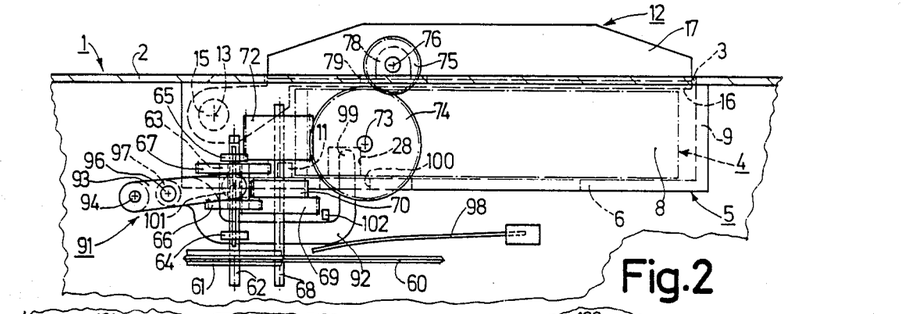
FIG. 2 shows essentially, in a section along the line II—II in FIG. 1, the speed change gear mechanism, switchable in steps, of the pocket dictating machine of the system according to FIG. 1 and a sensing device which senses an indicator provided on the system cassette for indicating the continuous total-recording time obtainable by means of the magnetic tape accommodated in this cassette, and which controls the switching of the speed change gear mechanism as a function of the indicator.

The system partially illustrated in FIGS. 1 and 2 comprises a pocket dictating machine 1 having, in its housing top wall 2, an orifice 3, through which a system cassette 4 can be inserted into an essentially trough-shaped cassette receptacle 5. The cassette receptacle 5 is limited by a bottom wall 6, a first side wall 7, a second side wall 8, a rear wall 9 and two front-wall portions 10 and 11, against which an inserted system cassette is pressed by means of a spring (not shown) engaging on the latter. To close the cassette receptacle 5, the machine 1 has a shutter flap 12 pivotable about an axle 13 which is secured by means of two stub shafts 14 and 15 rotatably mounted in an extension of two respective side walls 7 and 8. The shutter flap 12 is under the effect of a dead-center or toggle spring arrangement (not shown) which keeps the shutter flap 12 both in its closed position, shown in FIGS. 1 and 2, and in its open position, in which the shutter flap is at an angle of virtually 90° relative to the housing top wall 2. The shutter flap 12 consists of a bottom plate 16 and a dished cover 17 which is placed on the bottom plate 16, but which is not shown in FIG. 1 for the sake of clarity in the drawing.

As explained above, the machine 1 is designed for receiving a system cassette 4 which is represented in FIGS. 1 and 2 by a dot-and-dash line and which can be inserted into the machine in two operating positions rotated relative to one another. Each system cassette 4 has a cuboid housing and possesses two parallel main cassette walls, a front and a rear narrow cassette wall and two lateral narrow cassette walls. Two winding hubs 18 and 19 located next to one another are mounted rotatably in each system cassette 4, which also accommodates a magnetic tape 20 guided from the winding hub 18 to the winding hub 19 via a tape guide 21, along the front narrow cassette wall 22 and via a further tape guide 23. In the front narrow cassette wall 22 there are two perforations, through each of which is guided a magnetic head, namely an erase head 24 and a recording and playback head 25. In the two operating positions of each cassette 4 which are rotated relative to one another in respect of the two main cassette walls, the magnetic heads 24 and 25 each sense one track, that is to say altogether two tracks which can be sensed in opposite directions, through the perforations in the narrow side 22 of the cassette.

Cassettes of two different cassette types can be inserted into the machine 1. The cassettes of the two cassette types differ from one another in the diameter of their winding hubs and in the total length of the magnetic tapes in them. Because of the different total lengths of the magnetic tapes, continuous total-recording times of differing amounts can be obtained with them. In the cassette 4 illustrated in FIG. 1, which is of a first cassette type, a continuous total-recording time of thirty minutes for each operating position of the cassette, that is to say for each track on the magnetic tape, can be obtained. In order to indicate this, the cassette 4 has, on each of its two main walls, an indicating scale 26 of predetermined total length, the end points of which are designated by "0" and "30". Attached next to the indicating scale 26 is an indicating strip 27 made of a material containing magnetically orientable particles. To indicate the continuous total-recording time obtainable by means of the magnetic tape accommodated in the cassette 4, the cassette 4 has two indicators 28 and 29 which are each assigned to one of the two operating positions of the cassette 4 rotated relative to one another, that is to say each to one track on the magnetic tape. The indicators 28 and 29 are provided on the cassette 4 in two positions rotated relative to one another in respect of the two main cassette walls and are each formed by a recess in the cassette housing, each recess extending up to a main cassette wall and a lateral narrow cassette wall. As mentioned, it is also possible to insert into the machine 1 a cassette of a second cassette type, in which a continuous total-recording time of fifteen minutes for each operating positon of the cassette, that is to say for each track on the magnetic tape, can be obtained by means of the magnetic tape. In order to indicate this, the cassettes of the second cassette type also have, on each of their two main walls, an indicating scale, the total length of which corresponds to the predetermined total length of the indicating scale 26 on the cassettes 4 of the first cassette type and the end points of which are designated by "0" and "15". The cassettes of the second cassette type do not have recesses 28 and 29 as indicators for indicating the continuous total-recording value obtainable by means of the magnetic tape accommodated in them, but in this second cassette type the main cassette walls and the lateral narrow cassette walls are made continuous in the region in which there are the recesses 28 and 29 in the first cassette type, so that the continuous cassette walls form the indicators.

In order to advance a magnetic tape in the machine and transport it along the magnetic heads 24 and 25, during which the magnetic heads sense a track and recorded speech signals can be erased by means of the erase head 24 and speech signals can be recorded or played back by means of the recording and playback head 25, a drive device 30 for the magnetic tape is provided in the machine 1. The drive device 30 has a motor 31, by means of which it is possible to drive a first belt pulley 32 which is attached to its motor shaft and from which a first belt 33 is guided to a second belt pulley 34. The second belt pulley 34 is mounted rotatably on a bearing block 36 which is pivotable about an axle 35 fixed to the machine and which can be pivoted out of its middle position shown in FIG. 1, which it assumes in the "stop" mode, in opposite directions, indicated by the arrows 37 and 38, into two operating positions. This pivoting of the bearing block 36 is carried out by means of a mode selection slide (not shown) which can be adjusted by hand. When the bearing block 36 is pivoted into its first operating positon in the direction of the arrow 37, a drive shaft 39 connected fixedly in terms of rotation to the second belt pulley 34 can thereby be connected in drive terms to a friction wheel 40. Connected fixedly in terms of rotation to the friction wheel 40 is a first winding spindle 41 which projects through an orifice in the bottom wall 6 of the cassette receptacle 5 into the cassettte receiving space and which is connected in drive terms to the winding hub 19. When the bearing block 36 is pivoted into its second operating position in the direction of the arrow 38, a pinion 42 attached to the drive shaft 37 and connected fixedly in terms of rotation to the latter and to the second belt pulley 34 can thereby be engaged with a gear wheel 43. Connected fixedly in terms of rotation to the gear wheel 43 is a second winding spindle 44 which projects through an orifice in the bottom wall 6 of the cassette receptacle 5 into the cassette receiving space and which is connected in drive terms to the winding hub 18. In the first operating position of the bearing block 36, from the motor 31, the magnetic tape 20 can be driven in the modes, "normal forward run" and "fast forward run", depending on the selected motor speed, via the first belt pulley 32, the belt 33, the second belt pulley 34, the drive shaft 39, the friction wheel 40, the winding spindle 41 and the winding hub 19, and can thereby be advanced in the machine and wound onto the winding hub 19. In the second operating position of the bearing block 36, from the motor 31, the direction of rotation of which is now reversed in relation to the previously described drive connection, the magnetic tape 20 can be driven in the mode, "fast rewind", via the first belt pulley 32, the belt 33, the second belt pulley 34, the drive shaft 39, the pinion 42, the gear wheel 43, the winding spindle 44 and the winding hub 18, and can thereby be advanced in the machine and wound onto the winding hub 18.

After the cassette has been inserted into the system machine, the total amount of magnetic tape being located on the winding hub 18, it is advantageous for the user of such a system to know how much magnetic tape in a cassette has been advanced in the machine. Consequently, the machine 1 has a counter 45 for indicating the continuous recording value corresponding to the particular amount of magnetic tape advanced in the machine. In the pocket dictating machine under consideration here, the counter 45 is accommodated in the shutter flap 12 and has an indicating element which is driven during the advance of the magnetic tape 20 and which travels along the indicating scale 26 provided on the cassette 4. This indicating element is formed by a finger-like pointer 46 guided displaceably on a guide rod 47. At its free end, a small bar magnet 48 is positioned which projects through a window-shaped orifice 48a in the bottom plate 16 of the shutter flap 12, overlying the indicating strip 27 containing magnetically orientable particles. The orifice 48a allows the magnet 48 to conact the strip 27 so that when the pointer 46 travels along the indicating scale 26, the bar magnet 48 forms a visible continuous line on the indicating strip 27 as a result of the orientation of the magnetically orientable particles.

The guide rod 47 has a counter 45 is connected firmly, at one end, to a block 49, itself guided displaceably on a further guide rod 50 which is arranged perpendicularly relative to the guide rod 47 and which is held by two retention means 51 and 52 attached to the bottom plate 16. The other end of the guide rod 47 is guided in a guide block 53 attached to the bottom plate 16, so as to be displaceable perpendicularly relative to the direction of the guide rod 47. Connected to the block 49 is a tab 54 which is angled in an L-shaped manner and the forks-shaped free end of which is guided through a perforation 55 in the housing top wall 2 into the interior of the machine. Inside the machine, the fork-shaped end of the tab 54 is coupled to a pin 56 of a manually actuable adjusting device (not shown) by means of which the block 49, and therefore also the guide rod 47 and consequently the pointer 46, can be adjusted from its middle position shown in FIG. 1 in the direction of the two arrows 57 and 58. During these two adjusting movements, the permanent magnet 48 draws on the indicating strip 27 marking lines which project transversely from the abovementioned continuous line on the indicating strip 27. The adjusting movements mentioned are triggered by hand when specific dictation passages on the magnetic tape are to be identified, for example dictation passages to be corrected or the end of dictation. The marking lines drawn on the indicating strip 27 then indicate the position of these specific dictation passages on the magnetic tape 20. It should also be mentioned that, when the shutter flap 12 is closed, the pin 56 is automatically coupled to the fork-shaped end of the tab 54.

The pointer 46 provided as the indicating element can be driven from the drive device 30 for the magnetic tape 20. Connected fixedly, in terms of rotation, for this purpose, to the friction wheel 40, coaxial relative to the winding spindle 41 is a third belt pulley 59, by which a fourth belt pulley 61 can be driven via a second belt 60. The fourth belt pulley 61 is connected fixedly, in terms of rotation, to a shaft 62 mounted rotatably in the machine. A sleeve 63 is attached to the shaft 62 fixedly, in terms of rotation, and so as to be displaceable in the axial direction between two stops 64 and 65. This is achieved by means of a splined connection between the shaft 62 and the sleeve 63. Connected fixedly, in terms of rotation, to the sleeve 63 at its ends are a first spur wheel 66 and a second spur wheel 67 which are thus arranged coaxially relative to one another and which can be adjusted in the axial direction between two operating positions. Connected firmly to a further shaft 68 mounted rotatably in the machine are a third spur wheel 69 and a fourth spur wheel 70 which are not axially displaceable in the machine, but are fixed in place. In the first operating position of the spur wheels, which is shown in FIGS. 1 and 2, the first spur wheel 66 is engaged with the third spur wheel 69. In the second operating position (not shown) of the spur wheels, the second spur wheel 67 is engaged with the fourth spur wheel 70.

The four spur wheels 66, 67, 69 and 70 constitute a spur gear assembly 71 switchable in steps, which is provided as a speed change gear mechanism and which can be switched to different speed ratios in conformity with the continuous total-recording times of differing amounts. At the same time, the spur wheels are of differing design in terms of the transmission ratios obtainable, specifically the diameters of the spur wheels being selected so that the speed ratios of the spur gear assembly 71 are inversely proportional to the corresponding continuous total-recording times. This ensures that, by means of the entire predetermined total length of the indicating scales on the system cassettes, it is possible to indicate both of the continuous total-recording times determined by the respective lengths of the particular magnetic tapes. Such a spur gear assembly is cheap and simple to produce and can be switched simply and smoothly.

Also connected firmly to the rotatable shaft 68 is a worm 72 which is constantly engaged with a worm wheel 74 rotatable about a shaft 73 fixed to the machine. As is known, a very high transmission ratio can be obtained by means of such a worm gear assembly, so that, despite relatively long magnetic-tape lengths, a relatively short indicating-scale length is found to be sufficient. The worm wheel 74 can drive a gear wheel 75 which is fastened fixedly, in terms of rotation, to one end of a drive spindle 76 projecting from the shutter flap 12 and mounted rotatably in two bearing blocks 77 and 78 attached to the bottom plate 16. When the shutter flap 12 is closed, the gear wheel 75 engages automatically with the worm wheel 74 through a perforation 79 in the housing top wall 2, thereby making the drive connection for driving the pointer 46. Via an engaging tooth (not shown), an engaging block 80, guided displaceably on the guide rod 47 and having the engaging tooth, is connected in drive terms to the threaded part of the drive spindle 76. For the displaceable guidance of the pointer 46 and engaging block 80 on the guide rod 47, the two of them are attached to a sleeve 81 displaceable along the guide rod 47. Between the engaging block 80 and the pointer 46, there is a helical torsion spring 82 which is likewise attached to the sleeve 81 and which, by means of its two ends, holds the engaging block 80 and the pointer 46 down towards the bottom plate 16, so that the engaging tooth of the engaging block 80 remains in engagement with the threaded part of the drive spindle 76 and the permanent magnet 48 on the pointer 46 remains held down against the indicating strip 27. Also attached to the engaging block 80 is a draw spring 83 which, at the other end, is fastened to a tab 84 attached to the bottom plate 16 and which serves as a restoring spring for returning the pointer 46 and the engaging block 80 into their initial position shown in FIG. 1. This initial position is determined by a stop 85 which is attached to the guide rod 47 and on which the pointer 46 is supported.

When the magnetic tape 20 is driven and advanced, the pointer 46 is also driven in synchronism with the magnetic tape via the third belt pulley 59, the belt 60, the fourth belt pulley 61, the spur gear assembly 71 designed as a spur gear, the worm 72, the worm wheel 74, the gear wheel 75, the drive spindle 76, the engaging block 80 and the sleeve 81, the pointer thereby travelling along the indicating scale 26. At the same time, the transmission of the entire drive train, especially the transmission of the spur gear assembly 71 in the particular use illustrated in FIGS. 1 and 2, in which a cassette of the first cassette type with a continuous total-recording time of 30 minutes per track is inserted into the machine, is selected so that, after the entire magnetic tape has been wound onto the winding hub 19 from the winding hub 18, the pointer 46 has reached the point on the indicating scale 27 designated by "30".

Towards the end of an operation to open the shutter flap 12, the pointer 46 is made to return to its initial position shown in FIG. 1. For this purpose, a release plate 86 is mounted on the bottom plate 16 of the shutter flap 12, by means of two tabs projecting from the release plate 86 and projecting into orifices in the bottom plate, so as to be pivotable about an axle 87. The release plate 86 always reaches under the engaging block 80, specifically independently of its momentary position. The release plate 86 has a sickle-shaped tab 89 projecting from the latter and reaching through an orifice 88 in the bottom plate 16 into the interior of the machine. When the shutter flap 12 is in the closed state, the tab 89 is supported on a run-on slope 90 in the machine, the release plate 86 being pressed towards the bottom plate 16 counter to the force of a leaf spring 86a located between it and the bottom plate 16. When the shutter flap 12 is opened, the tab 89 slides down from the run-on slope 90, the release plate 86 then being pivoted away from the bottom plate 16 by means of the force of the leaf spring 86a. At the same time, the release plate 86 comes up against the engaging block 80 and pivots the latter about the guide rod 47 counter to the force of the helical torsion spring 82, so that the engaging tooth on the engaging block 80 is disengaged from the threaded part of the drive spindle 76. The restoring spring 83 can thereby shift the engaging block 80, together with the pointer 46, back into their initial position, the engaging block 80 sliding along the release plate 86.

In order to sense the above-described mechanically sensed indicators for indicating the continuous total-recording time per track which can be obtained by means of the magnetic tape accommodated in a cassette inserted into the machine, only a single sensing device 91 is provided in the machine. The sensing device 91 has a first lever 92 and a second lever 93 which are mounted so as to be pivotable independently of one another about a shaft 94 fixed to the machine. Inserted into the two levers 92 and 93 are respective pins 95 and 96 which are aligned with one another and on which a coiled wire spring 97 is attached, so that the two levers 92 and 93 are coupled to one another via the wire spring 97 and by means of the wire spring can be held in a position aligned with one another. A leaf spring 98 clamped in the machine engages on the first lever 92 and stresses the lever 92 in the direction of the cassette receptacle 5. Depending on the operating position of the cassette inserted into the cassette receptacle 5, the first lever 92 senses one of the two indicators 28 and 29. For this purpose, the free end 99 of the first lever 92 projects through an orifice 100 in the bottom wall 6 of the cassette receptacle 5 into the cassette receiving space and there senses the respective indicator. In the particular case illustrated, this is the indicator 28. The second lever 93 controls the switching of the spur gear assembly 71. For this purpose, the second lever 93 carries, at its free end, a cylindrical extension 101 which projects between the first spur wheel 66 and the second spur wheel 67, so that, when the second lever 93 is pivoted, the two spur wheels 66 and 67 of the spur gear assembly 71 are adjusted in the axial direction. This ensures that the sensing device 91 controls the switching of the spur gear assembly 71 for driving the pointer 46, as a function of the sensed indicator on the cassette. It is thus ensured, in a simple way, that the speed change gear mechanism, and in this example the spur gear assembly 71, is always switched correctly, thus reliably preventing false readings with the counter.

When a cassette of the first cassette type is inserted into the machine, a continuous total-recording time of 30 minutes per track being obtainable by means of its magnetic tape, the free end 99 of the first lever 92 enters the recess 28 or 29 provided as an indicator, depending on the operating position of the cassette, so that the first lever 92 then remains in its position shown in FIGS. 1 and 2, in which it is held by the leaf spring 98 and in which it is supported on a stop 102 fixed to the machine and shown only in FIG. 2. By means of the wire spring 97, the second lever 93 is held in the position aligned with the first lever 92, as is evident from FIG. 2, the first spur wheel 66 and the second spur wheel 67 being held, via the cylindrical extension 101 in their first operating position shown in FIG. 2. When a cassette of the second cassette type is inserted into the machine, a continuous total-recording time of 15 minutes per track being obtainable by means of its magnetic tape, the free end 99 of the first lever 92 is shifted counter to the force of the leaf spring 98 by the lower main wall of this cassette, so that the first lever 92 is pivoted in a clockwise direction, according to FIG. 2, into a position in which the free end 99 is supported on the lower main cassette wall. By means of the wire spring 97, the second lever 93 is likewise pivoted in a clockwise direction, since the wire spring endeavors to keep the first lever 92 and the second lever 93 in a position aligned with one another, the cylindrical extension 101 shifting the two spur wheels 66 and 67 in the axial direction into their second operating position, in which the second spur wheel 67 is engaged with the fourth spur wheel 70. Because the switchable speed change gear mechanism is designed as the spur gear assembly 71, during switching, the gear parts intermesh especially simply and smoothly. The transmission ratio between the second spur wheel 67 and the fourth spur wheel 70 is exactly twice the transmission ratio between the first spur wheel 66 and the third spur wheel 69. This ensures that, when a cassette of the second cassette type is inserted into the mechanism, the worm 72 and the following gear parts are driven exactly twice as fast as when a cassette of the first cassette type is inserted into the machine, so that in the present system, both continuous total-recording times of 30 minutes and 15 minutes can be indicated by means of the entire predetermined total length of the indicating scale.

Figure 3:
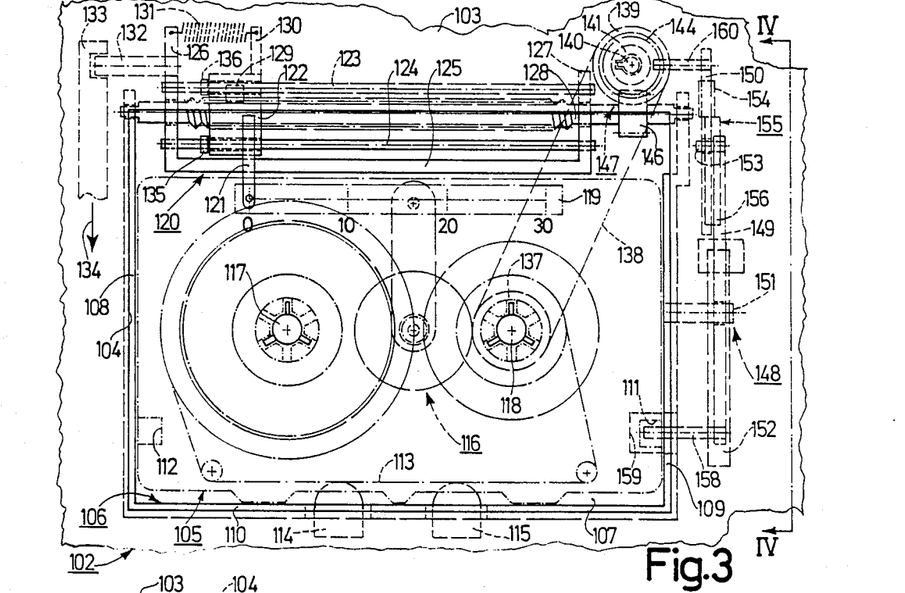
FIG. 3 shows a diagrammatic plan view, enlarged approximately twice, of a part of a second system essential to the invention, comprising a recording and playback machine designed as a desk-top dictating machine and magnetic tapes accommodated in cassettes and functioning as recording carriers, the counter of the desk-top dictating machine belonging to the system being arranged in the machine next to the cassette receiving space, and the speed change gear mechanism switchable in steps, for driving the indicating element of the counter, being designed as a worm gear assembly.
Figure 4:
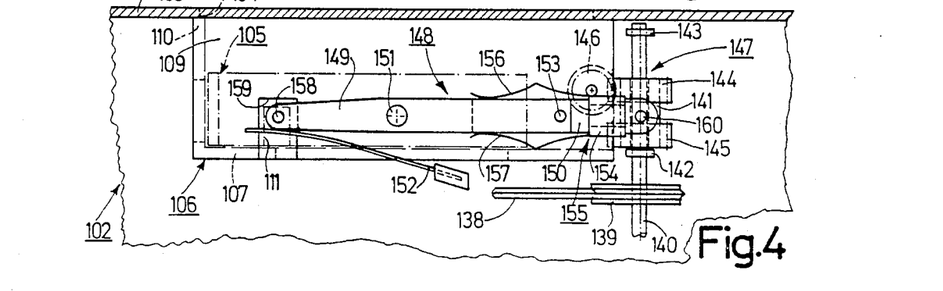
FIG. 4 shows essentially, in a section along the line IV—IV in FIG. 3, the speed change gear mechanism, switchable in steps, of the desk-top dictating machine of the system according to FIG. 3 and a sensing device which senses an indicator provided on the system cassette for indicating the continuous total-recording time obtainable by means of the magnetic tape accommodated in this cassette, and which control the switching of the speed change gear mechanism as a function of the indicator.

The system partially illustrated in FIGS. 3 and 4 comprises a desk-top dictating machine 102 having, an a housing top wall 103, an orifice 104, through which a system cassette 105 can be inserted into an essentially trough-shaped cassette receptacle 106. The cassette receptacle 106 is limited by a bottom wall 107, a first side wall 108, a second side wall 109 and a front wall 110, against which an inserted cassette is pressed by means of a spring (not shown) engaging on the latter. The orifice 104 can be closed by means of a pivotable shutter plate, but this this not shown for the sake of simplicity.

A cassette can be inserted into the desk-top dictating machine 102, in the same way as into the pocket dictating machine according to FIGS. 1 and 2, in two operating positions rotated relative to one another in respect of the two main cassette walls. The cassette 105, represented by dot-and-dash lines in FIGS. 3 and 4, has essentially the same design as the cassette 4 illustrated in FIGS. 1 and 2, except that the indicators 111 and 112, also in the form of recesses in the cassette housing, are provided at a somewhat different location on the cassette housing, and on the main cassette walls there are no indicating strips made of material containing magnetically orientable particles. An erase head 114 and a recording and playback head 115 interact with the magnetic tape 113 in the cassette 105 and each project through a perforation in the front wall 110 of the cassette receptacle 106. For driving and advancing the magnetic tape 113, the machine 102 has a drive device 116, by means of which the two winding spindles 117 and 118 can be driven selectively and which has the same design as that of the pocket dictating machine according to FIGS. 1 and 2, so that there is no need for a detailed description of the drive device 116.

Cassettes of two different cassette types can be inserted into the desk-top dictating machine 102, in the same way as into the pocket dictating machine according to FIGS. 1 and 2, a continuous total-recording time of 30 minutes being obtainable per track, that is to say for each operating position of the cassette, with the magnetic tape accommodated in a cassette of a first cassette type, and a continuous total-recording time of 15 minutes being obtainable per track, that is to say for each operating position of the cassette, with the magnetic tape accommodated in a cassette of a second cassette type. A cassette of the first cassette type is illustrated in FIGS. 3 and 4. For indicating the continuous total-recording time of 30 minutes for each operating position of the cassette, that is to say for each track on the magnetic tape, this cassette has the two indicators 111 and 112 which are designed as recesses in the cassette housing and which are each assigned to a track. Furthermore, this cassette has, on each of its two main walls, an indicating scale 119 of a predetermined total length, the end points of which are designated by "0" and "30". The cassettes of the second cassette type do not have any such recesses as indicators, but instead the cassette walls are made continuous in the region in which the cassettes of the first cassette type have the recesses, so that the continuous cassette walls constitute the indicators for indicating the continuous total-recording time of 15 minutes per operating position of the cassette, that is to say per track on the magnetic tape. Moreover, the cassettes of the second cassette type also have, on each of their two main walls, an indicating scale, the total length of which corresponds to the predetermined total length of the indicating scale 119 on the main walls of the cassettes of the first cassette type and the end points of which are designated by "0" and "15".

For indicating the continuous recording time corresponding to the particular amount of magnetic tape advanced in the machine, the desk-top dictating machine 102 has a counter 120 which is arranged next to the cassette receiving space of the cassette receptacle 106. The counter 120 has a pointer 121 which travels along the indicating scale 119 during the advancing of the magnetic tape and which is attached to an engaging block 122. The engaging block 122 is guided by means of two guide rods 123 and 124 so as to be displaceable in the longitudinal direction of the indicating scale 119. The two guide rods 123 and 124 are held in a U-shaped stirrup 125 mounted pivotably, by means of its two legs 126 and 127, on a drive spindle 128 which itself is mounted rotatably in the two side walls 108 and 109 of the cassette receptacle 106. During normal operation, the drive spindle 128 is engaged with an engaging toothing which is located at the free end of an L-shaped tab 129 projecting from the engaging block 122. A draw spring 131 takes effect between a further tab 130 projecting from the engaging block 122 and the leg 126 of the stirrup 125 and serves as a restoring spring for the engaging block 122 and the pointer 121. A pin 132 projects laterally from the leg 126 of the stirrup 125 and is coupled to an actuating rod 133. When the actuating rod 133 is shifted in the direction of the arrow 134, the stirrup 125 is thereby pivotable round the drive spindle 128 via the pin 132, in such a way that the pointer 121 is swung upwards away from an inserted cassette, so that the cassette, unimpeded by the pointer 121, can be taken from the cassette receptacle 106, and the engaging toothing on the free end on the L-shaped tab 129 of the engaging block 122 is disengaged from the drive spindle 128, as a result of which the restoring spring 131 can return the engaging block 122 and the pointer 121 to their initial positions shown in FIG. 3, in which the engaging block 122 is supported on two stops 135 and 136 provided on the guide rods 123 and 124. The shifting of the actuating rod 133 is controlled, in a way not shown, from the shutter flap for closing the cassette receiving space, specifically to the effect that when the shutter flap is opened the stirrup 125 is pivoted in order to swing up the pointer 121. Of course, the actuating rod 133 can also be shifted by hand via a separate operating button.

The pointer 121 is driven from the drive device 116. Connected coaxially to the winding spindle 118 is a first belt pulley 137 which is connected in drive terms to a second belt pulley 139 via a belt 138. The second belt pulley 139 is connected fixedly, in terms of rotation, to a shaft 140 mounted rotatably in the machine. A sleeve 141 connected fixedly, in terms of rotation, to the shaft 140 is guided on the latter so as to be displaceable in the axial direction between two end positions determined by stops 142 and 143. This is achieved by means of a splined connection between the shaft 140 and the sleeve 141. Connected firmly to the sleeve 141 are two worms 144 and 145 of differing design as regards the transmission ratios obtainable. The two worms 144 and 145 have differing numbers of starts, specifically the worm 144 being single-start and the worm 145 being two-start. The two worms 144 and 145, adjustable in the axial direction by means of the sleeve 141, can be adjusted between two operating positions and engaged with a fixed worm wheel 146, from which the pointer 121 can be driven. For this purpose, the worm wheel 146 is connected firmly to the drive spindle 128. In the operating position of the two worms 144 and 145 which is shown in FIG. 4, the single-start worm 144 is engaged with the worm wheel 146. In the other operating position (not shown), in which the sleeve 141 is supported on the stop 143, the two-start worm 145 is engaged with the worm wheel 146, so that, because of the doubled number of starts in this operating position, a transmission ratio twice as high as in the first operating position is obtained.

The two worms 144 and 145 and the worm wheel 146 constitute a worm gear assembly 147 which is provided as a speed change gear mechanism switchable is steps. As in known, especially high transmission ratios can be obtained by means of such a worm gear assembly which is a special type of a toothed gear assembly. Thus, in the particular desk-top dictating machine under consideration here, to ensure that a relatively short total length of the indicating scale for the counter is sufficient, a high ratio is obtained by means of the speed change gear mechanism switchable in steps, without the need for a separate worm-gear stage in the drive train for driving the pointer of the counter.

To sense the above-described mechanically sensed indicators for indicating the continuous total-recording time per track, obtainable with a magnetic tape of a cassette inserted into the machine, a sensing device 148 is provided in the machine 102. The sensing device 148 has a first lever 149 and a second lever 150. The first lever 149 is mounted pivotably about a bearing pin 151 projecting from the side wall 109 of the cassette receptacle 106 and is under the effect of a leaf spring 152 supported in the machine. The two levers 148 and 150 are coupled in an articulated manner via a coupling pin 153 which is inserted firmly into the first lever 149 and about which the second lever 150 is pivotable. Furthermore, the two levers are coupled to one another via a leg spring 155 surrounding the second lever 150 by means of a base part 154 and can be held, by means of this leg spring, in a position aligned with one another, because the two legs 156 and 157 of the leg spring 155 are supported at the same time on the mutually aligned side edges of the two levers 149 and 150. Inserted into the first lever 149, at its free end, is a laterally projecting sensing pin 158 which projects into the cassette receiving space through a perforation 159 extending from the bottom wall 107 into the side wall 109 of the cassette receptacle 106, and by means of which one of the two indicators can be sensed, depending on the operating position of the inserted cassettes. The second lever 150 controls the switching of the worm gear assembly 147 as a function of the sensed indicator. For this purpose, the second lever 150 carries, at its free end, a laterally projecting switching pin 160, the free end of which projects between the two worms 144 and 145, so that, when the second lever 150 is pivoted, the two worms 144 and 145 of the worm gear assembly 147 are shifted in the axial direction. This ensures that the sensing device 148 controls the switching of the worm gear assembly 147 for driving the pointer 121, as a function of the sensed indicator. It is thus ensured in a simple way, on this machine also, that the speed change gear mechanism is always switched correctly, thereby reliably preventing false readings with the counter.

When a cassette of the first cassette type is inserted into the machine 102, this cassette having recesses as indicators 111 and 112, the sensing pin 158 enters the recess and the first lever 149 therefore remains unadjusted in the position shown in FIG. 4. At the same time, via the leg spring 155, the second lever 150 remains in its position aligned with the first lever 149, the switching pin 160 keeping the sleeve 141 laid against the stop 142 via the second worm 145. Consequently, the single-start worm 144 remains engaged with the worm wheel 146. When a cassette of the second cassette type is inserted into the machine 102, because there are no recesses, the sensing pin 158 is shifted by the continuous lower main cassette wall acting as an indicator, so that the first lever 149 is pivoted counter to the force of the leaf spring 152. This pivoting movement is transmitted to the second lever 150 via the leg spring 155, so that the switching pin 160 shifts the sleeve 141 towards the stop 143 via the first worm 144 the second worm 145 then engaging with the worm wheel 146. If, when a worm engages with the worm wheel, the teeth of these strike one another unfavorably so that engagement cannot occur directly, in which case the second lever is pivoted out of its position aligned with the first lever, one of the two legs 156 or 157 of the leg spring 155 is tensioned and, as soon as the worm gear assembly is set in motion, provides a force for the interengaging of the gear parts. The leg spring 155 thus constitutes an overload prevention means, as provided in a similar way by the wire spring 97 in the machine of the system according to FIGS. 1 and 2. Since the transmission ratio with the two-start worm 145 is exactly twice as high as that with the single-start worm 144, this ensures that, when a cassette of the second cassette type is inserted into the machine, the drive spindle 128 is driven exactly twice as fast as when a cassette of the first cassette type is inserted into the machine, so that, with this system too, both continuous total-recording times of 30 minutes and 15 minutes can be indicated by means of the entire predetermined total length of the indicating scale 119.

Figure 5:
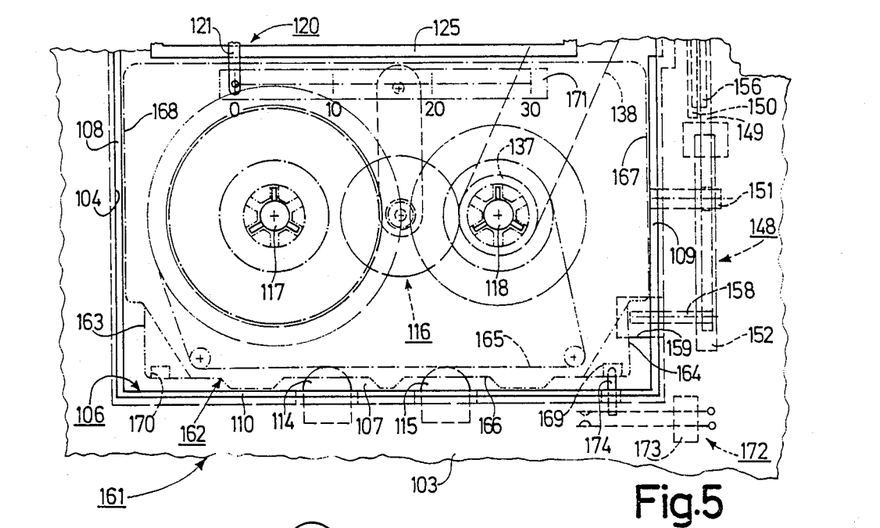
FIG. 5 shows, in the same way as FIG. 3, a third system which comprises a recording and playback machine designed as a desk-top dictating machine and magnetic tapes accommodated in cassettes and functioning as recording carriers, both the machine and the cassettes of the system according to FIG. 5 having a design different from that of the machine and cassettes of the system according to FIGS. 3 and 4.

As already mentioned, the desk-top dictating machine 161 partially illustrated in FIG. 5 has a design somewhat different from that of the desk-top dictating machine 102 of the system according to FIGS. 3 and 4, therefore machine parts shown in FIG. 5 and identical to parts of the machine according to FIGS. 3 and 4 are designated by the same reference symbols as in FIG. 3.

A cassette can be inserted in two operating positions rotated relative to one another into the desk-top dictating machine 161 of the system according to FIG. 5, in the same way as into the above-described two dictating machines 1 and 102 of the systems according to FIGS. 1, 2 and 3, 4. The cassette 162, shown in detail in FIG. 6 and represented merely diagrammatically by dot-and-dash lines in FIG. 5, has a similar design to that of the cassettes 4 and 105 illustrated in FIGS. 1, 2 and 3, 4. However, the indicators 163 and 164, also designed as recesses in the cassette housing for indicating the continuous total-recording time obtainable per track by means of the magnetic tape 165 accommodated in the cassette 162, take a different form. Specifically, these recesses 163 and 164, each assigned to one track, that is to say, each assigned to one operating position of a cassette, are provided in the two front corner regions of the cassette 162 and extend up to the two main cassette walls, to the front narrow cassette wall 166 and to a lateral narrow cassette wall 167 and 168 respectively. As a result of this design of the recesses 163 and 164, the cassette, as seen in a direction perpendicular to the front narrow cassette wall 166, has in its front region two mutually symmetrical lateral contractions in relation to the remaining cassette housing.

Furthermore, the cassette 162, on its front narrow cassette wall 166, has two erase prevention indicators 169 and 170 which are indicated merely diagrammatically in FIG. 5 and which are each assigned to one of the two mutually rotated operating positions of the cassettes and therefore are each assigned to one track of the magnetic tape 165 accommodated in the cassette 162. The erase prevention indicators 169 and 170 are formed, in a way known per se, by perforations closed by means of breakout tabs. The information signals stored in a track are protected against erasure, when the tab of the erase prevention indicator 169 or 170 assigned to this track is broken out. It should also be mentioned that, like the cassette 105 of the system according to FIGS. 3 and 4, the cassette 162 of the system according to FIG. 5, does not have, on the main cassette walls, an indicating strip made of material containing magnetically orientable particles. However, in a modified embodiment of the cassettes of the system according to FIG. 5, such indicating strips made of material containing magnetically orientable particles can certainly be provided on the modified cassettes.

Figure 6:
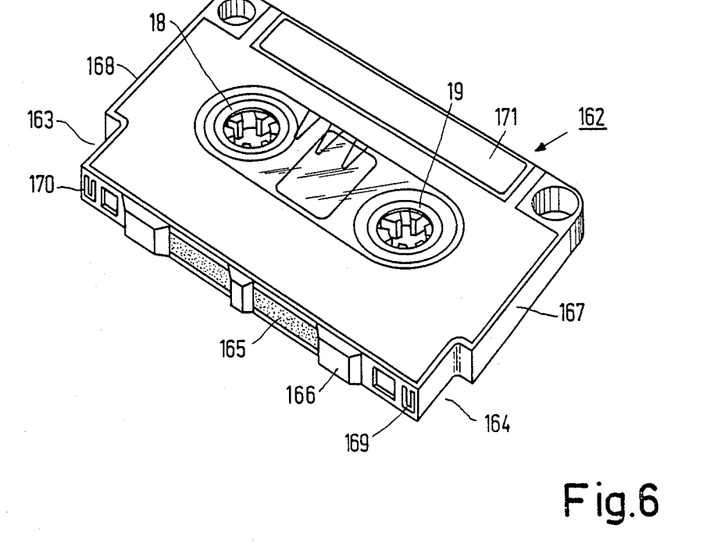
FIG. 6 shows a perspective view of a cassette according to the embodiment shown diagrammatically in FIG. 5 in a more detailed representation.

As in the two above-described dictating machines 1 and 102 of the systems according to FIGS. 1, 2 and 3, 4, cassettes of two different cassette types can be inserted into the desk-top dictating machine 161, a continuous total-recording time of 30 minutes being obtainable for each operating position, that is to say per track, with the magnetic tape accommodated in a cassette of a first cassette type, and a continuous total-recording time of 15 minutes being obtainable for each operating position, that is to say per track, with the magnetic tape accommodated in a cassette of a second cassette type. A cassette of the first cassette type is shown in FIGS. 5 and 6. To indicate the continuous total-recording time of 30 minutes per track, this cassette has, in its two front corner regions, the two indicators 163 and 164 which are designed as recesses in the cassette housing and which are each assigned to a track. Furthermore, this cassette has, on each of its two main walls, an indicating scale 171 of predetermined total length, the end points of which are designated by "0" and "30". The cassettes of the second cassette type have no such recesses as indicators in their two front corner regions, but instead the cassette walls are made continuous in the region in which the cassettes of the first cassette type have recesses, so that the continuous cassette walls form indicators for indicating the continuous total-recording time of 15 minutes per track. Moreover, the cassettes of the second cassette type also have, on each of their two main walls, an indicating scale, the total length of which corresponds to the predetermined total length of the indicating scale 171 on the main walls of the cassettes of the first cassette type and the end points of which are designated by "0" and "15".

In order to indicate the continuous recording time corresponding to the particular amount of magnetic tape advanced in the machine, the desk-top dictating machine 161 has a counter 120 having, as a whole, the same design as the counter of the desk-top dictating machine 102 of the system according to FIGS. 3 and 4 and of which only the pointer 121 and the U-shaped stirrup 125 are shown in FIG. 5. The pointer 121 is driven in exactly the same way as on the machine 102 of the system according to FIGS. 3 and 4 from the drive device 116 via a worm gear assembly provided as a speed change gear mechanism.

In order to sense the above-described mechanically sensed indictors 163 and 164 for indicating the continuous total-recording time for each operating position of the cassettes, that is to say per track on the magnetic tape, obtainable with the magnetic tape accommodated in a cassette inserted into the machine, there is, in the desk-top dictating machine 161, a sensing device 148 which corresponds exactly to the sensing device of the desk-top dictating machine 102 of the system according to FIGS. 3 and 4. When a cassette of the first cassette type having recesses as indicators 163 and 164 is inserted into the machine 161, the sensing pin 158 of the sensing device 148 enters the respective recess, without being shifted by the cassette housing, and the first lever 149 therefore remains unadjusted, so that, exactly as in the machine 102 of the system according to FIGS. 3 and 4, the single-start worm remains engaged with the worm wheel of the worm gear assembly for driving the pointer 121 of the counter 120. When a cassette of the second cassette type is inserted into the machine 161, because there are no recesses, the sensing pin 158 is shifted by the continuous main cassette wall acting as an indicator, so that the first lever 149 is pivoted counter to the forceof the leaf spring 152, the second worm then engaging with the worm wheel of the worm gear assembly. Since the transmission ratio with the two-start worm is exactly twice that of the single-start worm, this ensures that, when a cassette of the second cassette type is inserted into the machine, the drive spindle of the counter 120 is driven exactly twice as fast as when a cassette of the first cassette type is inserted into the machine, as a result of which both continuous total-recording times of 30 minutes and 15 minutes can be indicated by means of the entire predetermined total length of the indicating scale 171.

For sensing the erase prevention indicators 169 and 170, only a single further sensing device 172 is provided in the desk-top dictating machine 161. The sensing device 172 has an electrical switch 173 with two spring contacts, one spring contact having attached to it a sensing pin 174, by means of which the indicators 169 or 170 can be sensed, depending on which of the two operating positions rotated relative to one another a cassette assumes when it is inserted into the machine. When the tab of the sensed indicator 169 or 170 is broken out, the sensing pin 174 penetrates into the respective perforation, as shown in FIG. 5, the switch 173 then remaining in its open state. This switch state is evaluated in the machine 161 in a way not shown in detail, so that it is possible to erase existing recordings and make new recordings. If the tab of the sensed indicator 169 or 170 is not broken out, the sensing pin 174 is pivoted by the tab in such a way that the switch 173 is brought into its closed switch state. This switch state is evaluated in the machine to the effect that it is not possible to erase or make recordings. Of course, the further sensing device for sensing the erase prevention indicators 169 and 170 could also be formed by a lever or slide which can be adjusted by a break-out tab counter to the spring force and which mechanically, for example as result of interaction with the actuating member for cutting in the "recording" mode, prevents the "recording" mode from being cut in and consequently prevents recordings from being erased or made.

As in the two above-described machines of the systems according to FIGS. 1, 2 and 3, 4, in the desk-top dictating machine 161 of the system according to FIG. 5 too, the speed change gear mechanism for driving the counter pointer is switched automatically and reliably to the speed ratio corresponding to the continuous total-recording time obtainable for each track of a cassette, as result of the insertion of this cassette into the machine, so that continuous total-recording times of differing amounts for each track can be indicated by means of the same scale length of the indicating scale of the counter. Because the cassette inserted into the machine of the system according to FIG. 5 has recesses provided in the front corner regions as indicators for the continuous total-recording times per track, there is also the advantage that when this cassette is inserted into the machine, the cassette being advanced, parallel to its main cassette walls and with its front narrow cassette wall foremost, up to the magnetic heads arranged in a stationary manner in the machine, the sensing pin 158 of the sensing device 148 can enter the particular recess directly, without the sensing pin having to be shifted out of its position of rest beforehand by the cassette housing. This is advantageous in terms of a smooth and undisturbed insertion of a cassette into the machine and only slight stress exerted on the sensing device. Because the erase prevention indicators are arranged on the front narrow cassette wall, the same advantages are also obtained where the further sensing device for sensing the erase prevention indicators is concerned. The fact that both the recesses provided as indicators for indicating the continuous total-recording values per track and the recesses provided as erase prevention indicators can be sensed by the respective sensing device in the region of the front narrow cassette wall, a further advantage arising from this is that the sensing devices take up virtually no space in the direction perpendicular to the main cassette walls, thus ensuring as low an overall height as possible, this being beneficial and sought after on potable desk-top dictating machines in particular.

A whole series of further deisgns is possible within the scope of the invention. For example, in a further system, cassettes of more than two cassette types, differing from one another in the continuous total-recording times per track, can also be inserted into a machine, in which case the speed change gear mechanisms can be switched through a number of transmission steps corresponding to the number of cassette types, as a function of the indicators for indicating these continuous total-recording times. At the same time, several recesses can also be provided in the cassette housing as indicators for a continuous total-recording time. The above-described exemplary embodiments relate to systems with dictating machines. The invention can also be used in other systems with recording and/or playback machines for tapelike record carriers, for example in systems with so-called radio recorders or video recorders. In the above-described systems with dictating machines, the continuous total-recording times are given in minutes. Of course, the continuous total-recording times can alternatively be indicated in other quantities, for example in meters. Continuous total-recording times of differing amounts can be obtained not only be means of record carriers of differing length, but also as a result of different advancing speeds of record carriers of the same length. In the spur gear assembly of the machine of the system according to the first exemplary embodiment, the spur wheels driven from the drive device for the recording carrier are adjustable in the axial direction, and the spur gears, by which the indicating element of the counter is driven, are arranged fixed in place; if appropriate, a spur gear assembly can also have fixed spur wheels, which are driven by the drive device for the recording carrier, and axially adjustable spur wheels for driving the indicating element of the counter.

We claim:

1. A system for recording and/or reproducing signals on a tape-shaped record carrier, said system comprising a machine into which any one of a plurality of tape-shaped record carriers may be inserted, said plurality of tape-shaped record carriers having a number of different amounts of continuous total-recording time obtainable therefrom on said machine, wherein said machine includes a counter having an indicating element for indicating on an indicating scale of a predetermined total length, a continuous recording time corresponding to a particular quantity of a tape-shaped record carrier advanced in said machine, said machine further including a drive device for driving said record carrier and a speed change gear mechanism driven by said drive device for driving said counter, said speed change gear mechanism being switchable in a plurality of steps corresponding to said number of different amounts of continuous total-recording time of said plurality of said tape-shaped record carriers for driving said indicating element at different respective speeds inversely proportional to said different amounts of continuous total-recording time of said plurality of said tape-shaped record carriers, whereby each of said different amounts of continuous total-recording time can be indicated by said indicating element over the entire predetermined total length of said indicating scale, characterized in that said tape-shaped record carriers are contained in substantially identical cassettes, each of said cassettes having at least one indicator for indicating the amount of continuous total-recording time of the tape-shaped record carrier contained therein, and said machine comprises a sensing device for sensing said at least one indicator of said cassette inserted into said machine, said sensing device including means for switching said speed change gear mechanism for driving said indicating element in accordance with the amount of continuous total-recording time of said tape-shaped record carrier indicated by said at least one indicator.

2. The system according to claim 1, wherein said speed change gear mechanism comprises a toothed gear assembly, characterized in that the toothed gear assembly has a number of gears coaxial relative to one another and of differing design as regards the transmission ratios obtainable, this number corresponding to said number of different amounts of continuous total-recording times of said tape-shaped record carriers, said number of gears being adjustable in an axial direction between a number of operating positions corresponding to the number of different amounts of continuous total-recording time and, at the same time, being engageable with at least one fixed gear.

3. The system according to claim 2, characterized in that the adjustable gears are formed by adjustable spur wheels of different diameters, and said at least one fixed gear is formed by fixed spur wheels corresponding to said adjustable spur wheels and likewise coaxial relative to one another.

4. The system according to claim 2, characterized in that the adjustable gears are formed by worms which are driven from the drive device and have different numbers of starts, and said at least one fixed gear is formed by a fixed worm wheel, from which the indicating element can be driven.

5. The system according to claim 1, characterized in that said at least one indicator on said cassettes is sensed mechanically by the sensing device, and the sensing device has two levers which are coupled to one another at least via a spring and are held in a position aligned with one another by the spring, one of said levers sensing the at least one indicator on the cassetee and the other of said levers controlling the switching of the speed change gear mechanism.

6. The system according to claim 1, wherein each of the cassettes has two parallel main cassette walls, a front and a rear narrow cassette wall and two lateral narrow cassette walls, characterized in that the cassettes can be inserted into said machine in either of two operating positions rotated relative to one another in respect of the two main cassette walls, in that at least one indicator on the cassette is assigned to each of the two operating positions of the cassettes, and the indicators assigned to the two operating positions are provided on the cassettes in two positions rotated relative to one another in respect of the two main cassette walls, in that the machine has only a single sensing device, and in that each of the indicators assigned to the two operating positions can be read by means of the single sensing device depending on the operating position of the cassette.

7. The system according to claim 6, characterized in that the indicators are each formed by a recess in a respective one of the lateral narrow cassette walls and extend up to a respective one of the main cassette walls.

8. The system according to claim 7, characterized in that each of the two recesses is provided in a front corner region of the cassette housing and extends up to the two main cassette walls, a lateral narrow cassette wall and the front narrow cassette wall, so that the cassette, as seen in a direction perpendicular to the front narrow cassette wall, has, in its front region, two mutually symmetrical lateral contractions in relation to the remaining cassette housing.

9. The system according to claim 8, characterized in that each of the cassettes additionally has, on the front narrow cassette wall, two erase prevention indicators which are each assigned to one of the two cassette operating positions rotated relative to one another and which are provided on the cassette in two positions rotated relative to one another in respect of the two main cassette walls, in that the machine has only one further sensing device for sensing the two erase prevention indicators, and in that the indicators and the erase prevention indicators can be sensed by the sensing device and the further sensing device when the cassette is inserted into the machine as a result of the shifting of the cassette parallel to the main cassette walls, with the front narrow cassette wall foremost.

* * * * *